April 5, 1932.                G. RAYMOND                1,852,373
                            FLOAT CONSTRUCTION
                          Filed March 24, 1930
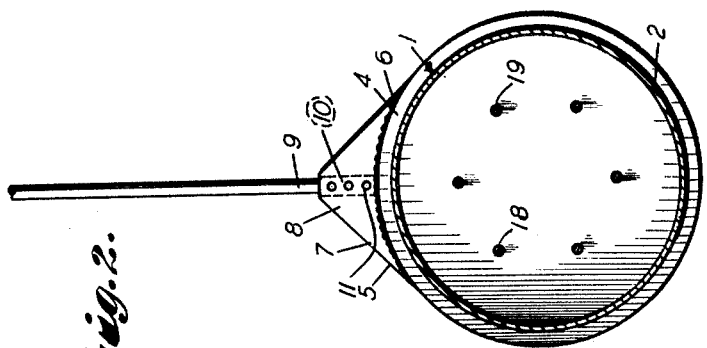
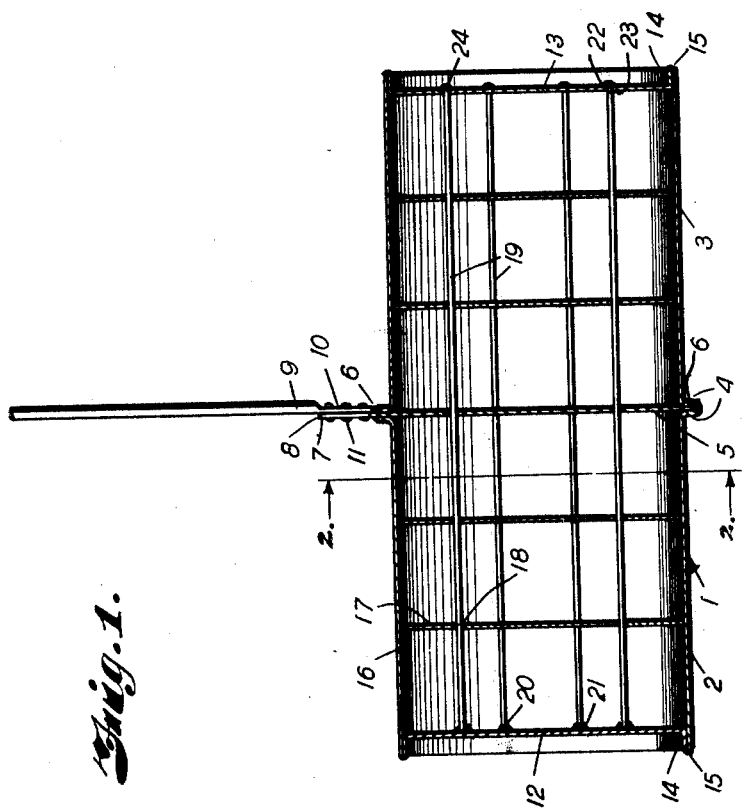
INVENTOR
Gwynne Raymond
BY Arthur E. Brown.
ATTORNEY Patented Apr. 5, 1932

1,852,373

UNITED STATES PATENT OFFICE

GWYNNE RAYMOND, OF KANSAS CITY, MISSOURI

FLOAT CONSTRUCTION

Application filed March 24, 1930. Serial No. 438,424.

My invention relates to floats of the type adapted to move responsively to changes of level in a liquid for controlling or operating valves or the like, and particularly to devices of that character for installation inside of a liquid container where they are relatively inaccessible and may be subjected to severe pressures and strains due to expansion of fluids and contacts with foreign materials in the container.

When a float is required to transmit a relatively large amount of force, for example, to move a shaft rotatively for operating a valve, it must have a large displacement volume, and pressures and strains to which the float is subject tend to distort and rupture the walls of the float drum and thus reduce or destroy its efficiency.

A float rod is usually attached to one wall of the float drum, for example the end wall of a cylindrical drum, and the transmission of a large amount of torque from a float to a shaft puts excessive strain on the rod, thus incurring danger of damage to the rod and of disconnecting the rod from the float. Any increased resistance to the movement of the float due, for example, to clogging of a valve increases the strain and danger of damage to the float and rod.

When a float is installed in a relatively inaccessible liquid chamber its condition cannot be readily observed nor can it be easily removed for repair or replacement.

In view of the conditions above described and others which are well known, my invention has for its principal objects to assure transmission of a large amount of torque by an inside float to a rotative shaft, to reduce the hazard of damage to a float and float rod when subject to relatively severe pressures and strains, to reenforce a float drum for reducing hazard of distortion thereof under pressure and strains, to strengthen the connection between a float rod and a float, and to enhance the rigidity of a reenforced float and its rod, whereby an inside float having relatively large displacement volume may efficiently and surely communicate its buoyant force to a float rod and to an operated member without requiring frequent inspection or removal for repairs.

Further particular objects of my invention are to provide an efficient reenforced float of relatively large displacement volume having a stem transverse to the longitudinal axis of the float drum, and to enhance the security of the attachment of a transverse stem to a float drum.

In accomplishing these and other objects of my invention, I have provided improved details of structure, the preferred forms of which are illustrated in the accompanying drawings, wherein:

Fig. 1 is a central longitudinal section through a float constructed in accordance with my invention.

Fig. 2 is a cross section on the line 2—2, Fig. 1.

Referring in detail to the drawings:

1 designates an elongated preferably cylindrical shell or drum comprising similar equal aligned sections 2 and 3 having exterior flanges 4 at their adjacent or inner end edges, and 5 designates a central diaphragm mounted between the sections and fixed to the flanges by welding or the like as indicated at 6 for securing the sections together to form a rigid float drum. The peripheral edge of the diaphragm registers with the outer edges of the flanges throughout the major portion of the peripheries of the flanges and diaphragm, and the welding is applied to said peripheries.

An edge portion 7 of the diaphragm 5 projects beyond the outer periphery of the drum and beyond the edges of the flanges to form an attaching ear or leaf 8, and a float rod 9 is provided with a flattened portion 10 engaging said ear and secured thereto by rivets 11, the diaphragm thus forming a base or foot for the rod whereby the same is securely connected to opposite wall portions of the drum and a rigid connection between the rod and drum is produced for supporting the float drum from a shaft or the like to which the other end of the rod may be connected.

Diaphragms or disks 12 and 13 are mounted at the outer ends of the sections to form heads or end walls and close the drum, each having an outwardly longitudinally extending end flange 14 engaging the inner periphery of the surrounding section and having an outer end edge flush with the outer end edge of the section to receive welding 15 for securing the diaphragms to the sections, the flanges thus spacing the heads inwardly from the end edges of the drum.

Fixed to the inner periphery of each section by welding 16 are a plurality of intermediate diaphragms 17 arranged between the central diaphragm and the heads in suitably spaced relation to afford requisite reenforcement for the wall of the drum.

Mounted in registering openings such as 18 formed in the several diaphragms are a plurality of stiffening rods 19 having ends 20 abutting the head 12 and fixed thereto by welding 21, and outer ends 22 located in openings 23 in the head 13 and fixed thereto by welding 24 applied exteriorly of the drum.

In constructing a float of the character above described the intermediate diaphragms will be installed in the separate tubular parts of the drum and fixed thereto, the head 13 will be fixed to the section 3, and the central diaphragm having the float rod attached thereto will be welded to the flanges of the sections, said welding securing the flanges together.

The rods will be arranged on the head 12 with their ends abutting against the inner face of the head and fixed thereto by the welding illustrated, to form a unit, which may be assembled with the other parts of the float by inserting the rods in the drum through the diaphragm openings and into the openings in the head 13 whereupon the head 12 may be welded to the section 2 and the rods welded to the head 13.

The diaphragms will stiffen the drum and reenforce the same laterally against compression and distortional stresses due to pressure, foreign matter or operation, and the longitudinal rods will reenforce the drum heads against distortion due to pressure and also stiffen the drum to prevent bending thereof.

The engagement of the rods in the diaphragm openings wherein they preferably engage relatively snugly as indicated in Fig. 2, produces cooperation between the rods and diaphragm for reenforcing the drum against stresses exerted in any direction.

The central diaphragm forms a rigid base or foot for the float rod whereby the rod is securely fixed to a plurality of diametrically opposite portions of the drum wall, and strains will be distributed over the entire periphery of the drum at the medium line thereof, thus avoiding possible distortion or fracture of the drum wall, and disconnection of the rod, which might occur if the rods were fastened to a relatively small area of a drum wall.

A float drum having relatively large displacement volume may thus be adapted for installation in a relatively inaccessible position and there will be assurance that the float will be substantially unaffected by accidental blows and external pressures tending to distort or collapse the same, and will operate efficiently under relatively heavy burdens of duty without danger of distortion to reduce or change its volume, rupture to admit liquid to the drum, and breakage to separate the rod from the drum.

What I claim and desire to secure by Letters Patent is:

1. In a float construction, an elongated shell, a plurality of diaphragms fixed to the inner wall of the shell, and a stem fixed to the edge of one of said diaphragms.

2. In a float construction, a shell, a plurality of diaphragms fixed to the inner surface of the shell, reenforcing rods mounted in said diaphragms, and a float rod extending substantially in the plane of and fixed to one of said diaphragms.

3. In a float construction, a shell, a plurality of diaphragms mounted in the shell including a diaphragm located intermediately between the ends of the shell and having an ear projecting externally therefrom, and a rod fixed to said ear.

4. In a float construction, a shell, a flange extending radially from the shell, a reinforcing member in the shell fixed to the flange, and a rod fixedly connected with said member.

5. In a float construction, a shell comprising equal portions in end abutting relation, a flange extending radially from the abutting ends of the portions, means for securing the portions together, and a rod fixedly connected with said flange.

6. In a float construction, a shell comprising aligned equal tubular portions having exterior flanges at adjacent ends, a diaphragm having a peripheral portion fixed to said flanges, and a float rod connected with said diaphragm.

7. In a float construction, a shell comprising aligned equal tubular portions having exterior flanges at adjacent ends, a diaphragm mounted between said portions to divide the shell and having a peripheral portion fixed to said flanges for securing said shell portions together, and a float rod attached to said diaphragm.

In testimony whereof I affix my signature.

GWYNNE RAYMOND.